J. J. HESS.
WEEDING HOOK.
APPLICATION FILED NOV. 25, 1911.
1,039,056.
Patented Sept. 17, 1912.
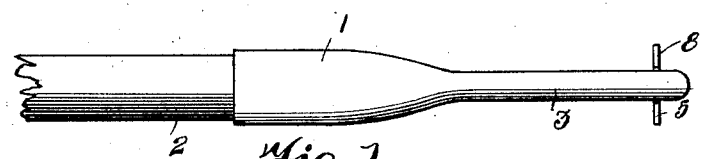
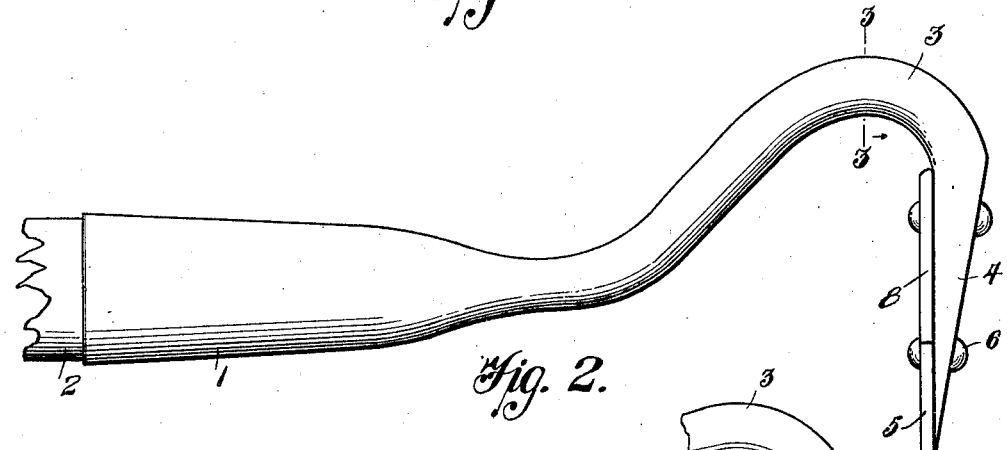
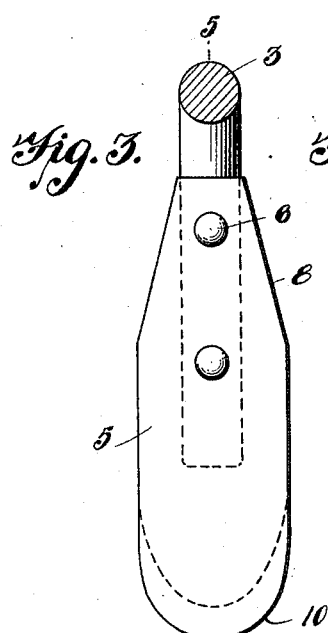
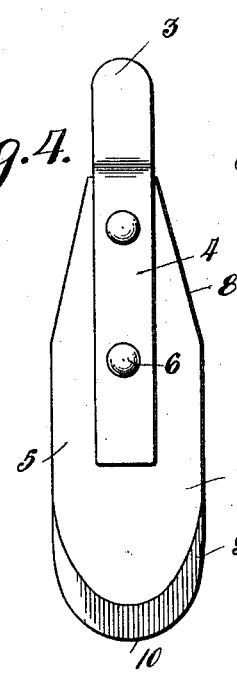
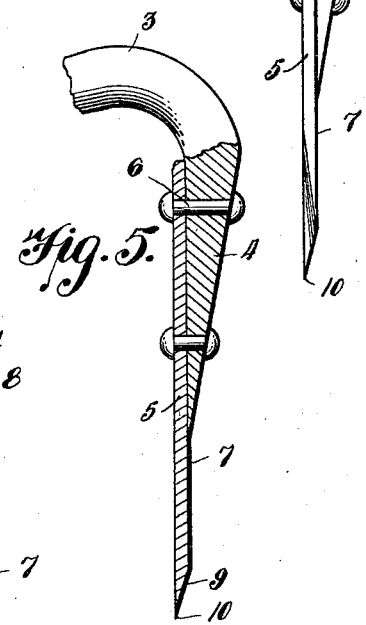
Julius J. Hess, Inventor
By Victor J. Evans
Attorney
Witnesses
Carroll Bailey

UNITED STATES PATENT OFFICE.

JULIUS J. HESS, OF ST. LOUIS, MISSOURI.

WEEDING-HOOK.

1,039,056.   Specification of Letters Patent.   Patented Sept. 17, 1912.

Application filed November 25, 1911. Serial No. 662,427.

*To all whom it may concern:*

Be it known that I, JULIUS J. HESS, a citizen of the United States, residing at St. Louis and State of Missouri, have invented new and useful Improvements in Weeding-Hooks, of which the following is a specification.

This invention relates to garden tools, and it has for its object to produce a weeding hook of simple and improved construction which may be very conveniently manipulated for the purpose of eradicating weeds from lawns and gardens.

A further object of the invention is to produce a tool for the purpose specified, the blade of which, while of such a shape that it will operate efficiently to cut into the soil for the purpose of loosening and uprooting the weeds, will be of such shape and dimensions that the lawn or plot from which the weeds are removed will not be disfigured thereby.

A further object of the invention is to produce a tool of the character described which may be conveniently and effectively used when the soil is dry and hard, thus enabling the weeds to be removed when the conditions are unfavorable to the sprouting of such roots as may be left in the ground, thus causing the weeds to be effectively killed and eradicated.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention; it being, however, understood that no limitation is necessarily made to the precise structural details therein exhibited, but that changes, alterations and modifications within the scope of the claim may be resorted to when desired.

In the drawing,—Figure 1 is a top plan view of a tool constructed in accordance with the invention. Fig. 2 is a side elevation, enlarged, of one end of the tool showing the working head of the same. Fig. 3 is a sectional view taken on the line 3—3 in Fig. 2. Fig. 4 is an end view. Fig. 5 is a sectional view taken on the line 5—5 in Fig. 3.

Corresponding parts in the several figures are denoted by like characters of reference.

The working head of the improved tool comprises a socket 1 into which one end of a handle 2 is inserted, and where said handle may be firmly secured. From the socket 1 extends a shank of round iron which is curved to form a goose neck 3 having a terminal wedge-shaped head 4 upon which the blade 5 is secured by means of rivets 6, the rear face of the wedge-shaped head being flattened so as to provide an ample supporting surface for the blade. The latter which is made of steel is relatively long and narrow, the lower or earth-engaging end of said blade being semi-oval, as shown at 7, while the upper end of the blade which is secured upon the head 4 is provided with upwardly converging side edges 8 terminating adjacent to the side edges of the wedge-shaped head 4 so as to avoid the presence of obstructing shoulders that might become entangled with weeds and the like. The lower semi-oval end of the blade is beveled upon the front side, as shown at 9, to provide a sharp semi-oval cutting edge 10.

It will be observed that owing to the construction of the shank with the curved portion or goose neck 3, the blade 4 will be positioned substantially at right angles to the handle 1. Said handle is in practice made of such length as to be conveniently grasped and operated by one hand. The blade 5 being quite narrow and provided with a sharp cutting edge may be readily driven into the ground adjacent to the stem or stalk of the weed or plant that is being removed, and will effectively cut the roots a considerable distance below the surface of the ground so as to permit the weed to be lifted out of the ground by a tilting movement of the handle, whereby the blade will be tilted in the ground so as to lift the weed completely above the ground. The action will be facilitated by the wedge-shaped head 4 which will provide a fulcrum to enable the blade to be tilted for the purpose of forcing the weed from the ground. The tool may also be utilized as a hook whereby the weed may be caught and thrown to one side.

The improved tool, as will be seen from the foregoing description, is extremely simple in construction, and it has proven to be thoroughly efficient for the purpose for which it is provided.

Having thus described the invention, what is claimed as new, is:—

A weeding hook comprising a head member having a handle receiving socket and a shank, said shank being curved to form a goose neck having a wedge-shaped head flattened on its rear side, and a blade secured upon the rear side of the head, said blade being relatively long and narrow and provided with upwardly converging side edges terminating adjacent to the side edges of the wedge-shaped head, said blade being provided with a semi-oval lower portion, the front face of which is beveled to provide a semi-oval cutting edge.

In testimony whereof I affix my signature in presence of two witnesses.

JULIUS J. HESS.

Witnesses:
   Jas. J. Hess,
   Gus. L. Hess.

---

Copies of this patent may be obtained for five cents each, by addressing the "Commissioner of Patents, Washington, D. C."